(12) United States Patent
Takahashi et al.

(10) Patent No.: US 9,706,108 B2
(45) Date of Patent: Jul. 11, 2017

(54) INFORMATION PROCESSING APPARATUS AND ASSOCIATED METHODOLOGY FOR DETERMINING IMAGING MODES

(71) Applicant: SONY CORPORATION, Tokyo (JP)

(72) Inventors: Masahiro Takahashi, Kanagawa (JP); Kenichi Okada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/423,526

(22) PCT Filed: Sep. 26, 2013

(86) PCT No.: PCT/JP2013/005705
§ 371 (c)(1),
(2) Date: Feb. 24, 2015

(87) PCT Pub. No.: WO2014/054249
PCT Pub. Date: Apr. 10, 2014

(65) Prior Publication Data
US 2016/0037056 A1    Feb. 4, 2016

(30) Foreign Application Priority Data

Oct. 3, 2012  (JP) ................. 2012-220877

(51) Int. Cl.
*H04N 5/222*  (2006.01)
*H04N 5/232*  (2006.01)

(52) U.S. Cl.
CPC ..... *H04N 5/23222* (2013.01); *H04N 5/23216* (2013.01); *H04N 5/23219* (2013.01); *H04N 5/23245* (2013.01); *H04N 5/23293* (2013.01)

(58) Field of Classification Search
CPC .................................. H04N 5/23293
(Continued)

(56) References Cited

U.S. PATENT DOCUMENTS 8,547,449 B2 * 10/2013 Imamura ............ H04N 5/23258
                                                  348/222.1
8,619,038 B2 * 12/2013 Chaudhri ............ G06F 3/04817
                                                  345/173
(Continued)

FOREIGN PATENT DOCUMENTS

JP    2007-88662 A    4/2007
JP    2008-311819 A    12/2008
(Continued)

OTHER PUBLICATIONS

Office Action issued Sep. 29, 2015 in Japanese Patent Application No. 2012-220877.
(Continued)

*Primary Examiner* — Joel Fosselman
(74) *Attorney, Agent, or Firm* — Oblon, McClelland, Maier & Neustadt, L.L.P.

(57) ABSTRACT

A method for an information processing apparatus includes causing display of an image, and recognizing a subject in a selected portion of the image. The method also includes identifying image settings modes based on the subject recognized in the selected portion of the image, and causing display of icons corresponding to the image setting modes identified. One of the image setting modes is then specified based on selection of one of the icons.

20 Claims, 18 Drawing Sheets

(58) Field of Classification Search
USPC .......................................... 348/333.02, 222.1
See application file for complete search history.

(56) References Cited

U.S. PATENT DOCUMENTS

| | | | |
|---|---|---|---|
| 8,643,740 B2* | 2/2014 | Fukata | G06K 9/00228 |
| | | | 348/222.1 |
| 2007/0065137 A1 | 3/2007 | Hara et al. | |
| 2009/0073285 A1* | 3/2009 | Terashima | H04N 5/23293 |
| | | | 348/231.99 |
| 2011/0050915 A1 | 3/2011 | Wang et al. | |
| 2012/0236162 A1 | 9/2012 | Imamura | |
| 2012/0236173 A1 | 9/2012 | Telek et al. | |
| 2014/0232273 A1* | 8/2014 | Sasaki | G06F 3/04817 |
| | | | 315/131 |

FOREIGN PATENT DOCUMENTS

| | | |
|---|---|---|
| JP | 2010-273167 A | 12/2010 |
| JP | 2011-10273 A | 1/2011 |
| JP | 2011-55096 A | 3/2011 |
| JP | 2011-217275 A | 10/2011 |
| JP | 2012-199675 A | 10/2012 |

OTHER PUBLICATIONS

International Search Report issued Nov. 28, 2013 in PCT/JP2013/005705.

* cited by examiner

FIG. 14

| SUBJECT | RECOGNITION RESULT | SHOOTING SETTING MODE |
|---|---|---|
| PERSON | • SEX, AGE<br>• FACIAL EXPRESSION<br>• NUMBER OF PEOPLE, DRESS<br>• BACKLIGHT, BRIGHTNESS<br>• POSITION OF FACE (COMPOSITION) | • BACKGROUND DEFOCUS<br>• SKIN CORRECTION<br>• TRIMMING<br>• SMILE SHUTTER<br>• BACKLIGHT CORRECTION (BRIGHTNESS)<br>• FLASH MODE<br>• MOVING IMAGE SHOOTING<br>• PICTURE EFFECT (E.G., MONOCHROME, SEPIA) |
| FLOWER | • COLOR OF FLOWERS<br>• NUMBER OF FLOWERS<br>• BACKLIGHT, BRIGHTNESS<br>• DISTANCE FROM SUBJECT<br>• POSITION OF FLOWER (COMPOSITION) | • FOCUS MODE<br>• FOCUS BRACKET<br>• TONE OF COLOR, CHROMA<br>• BRIGHTNESS<br>• PICTURE EFFECT (E.G., PART COLOR)<br>• TRIMMING<br>• MOVING IMAGE SHOOTING |
| BUILDING | • SHAPE, TONE OF COLOR<br>• POSITION OF BUILDING (COMPOSITION)<br>• BACKLIGHT, BRIGHTNESS | • BACKGROUND DEFOCUS<br>• DYNAMIC RANGE EXPANSION<br>• BACKLIGHT CORRECTION (BRIGHTNESS)<br>• TONE OR COLOR, CHROMA<br>• PICTURE EFFECT (E.G., MONOCHROME, SEPIA) |

INFORMATION PROCESSING APPARATUS AND ASSOCIATED METHODOLOGY FOR DETERMINING IMAGING MODES

TECHNICAL FIELD

The present technology relates to an information processing apparatus, an information processing method, and a program, and more particularly, to information processing apparatus, an information processing method, and a program which are capable of easily performing a detail setting according to a subject.

BACKGROUND ART

As digital cameras provide an increasing range of functions, the user can set various kinds of parameters related to shooting, but it is difficult for the user to use all functions effectively.

For example, the user may not recognize an installed function. Further, when the user recognizes an installed function, the user needs to actively select a function from a menu screen and execute the function. In a menu screen complicatedly hierarchized so that many functions can be selected, accessibility to each function is extremely low, and it is generally inconvenient for the user to use it.

In this regard, various kinds of techniques of enabling the user to use various kinds of functions have been proposed. For example, Patent Literature 1 discloses a technique of selecting a plurality of shooting modes according to a condition such as a present date and time or brightness of a captured image and presenting the selected mode as recommending shooting modes. The user can select a desired shooting mode from among a night view mode, a fireworks mode, and the like and then perform shooting.

CITATION LIST

Patent Literature

PTL 1: JP 2007-88662A

SUMMARY OF INVENTION

Technical Problem

In the technique disclosed in Patent Literature 1, the shooting mode is switched according to the user's selection, and various kinds of parameters such as brightness, a tone of color, and a shutter speed are collectively selected according to the selected shooting mode.

The present technology has been made in light of the foregoing, and it is desirable to easily perform a detail setting according to a subject.

Solution to Problem

In a first aspect of the present disclosure, a method for an information processing apparatus includes causing display of an image and recognizing, in a processor, a subject in a selected portion of the image. The method also includes identifying image settings modes based on the subject recognized in the selected portion of the image, and causing display of icons corresponding to the image setting modes identified. One of the image setting modes is then specified based on selection of one of the icons.

In another aspect of the present disclosure, a non-transitory computer-readable medium storing computer-readable instructions thereon, the computer-readable instructions when executed by a computer cause the computer to perform a method that includes causing display of an image, and recognizing a subject in a selected portion of the image. Image settings modes are also identified based on the subject recognized in the selected portion of the image, and display of icons corresponding to the image setting modes identified is caused. One of the image setting modes is then specified based on selection of one of the icons.

In a further aspect of the present disclosure, an information processing system includes a touch screen display to display an image and to receive selection of a portion of the image, and a processor configured to cause display of the image. The processor also recognizes a subject in the selected portion of the image and identifies image settings modes based on the subject recognized in the selected portion of the image. The processor then causes display of icons corresponding to the image setting modes identified, and specifies one of the image setting modes based on selection of one of the icons.

Advantageous Effects of Invention

According to the present technology, a detail setting can be easily performed according to a subject.

BRIEF DESCRIPTION OF DRAWINGS

FIG. 14 is a diagram illustrating an exemplary correspondence relation between a subject recognition result and a shooting setting mode.

DESCRIPTION OF EMBODIMENTS

Example of GUI (Graphical User Interface)

Figure 1:
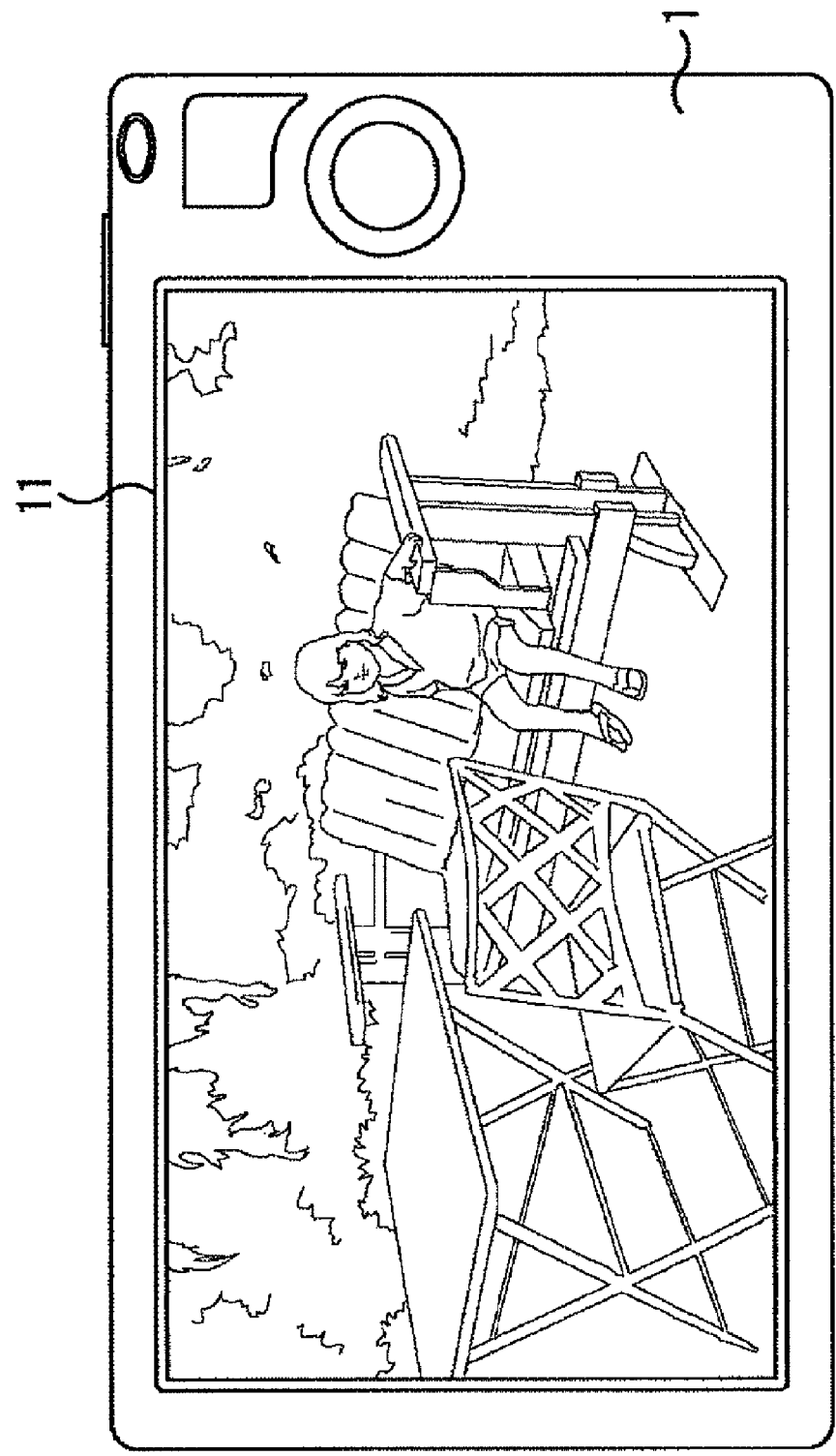
FIG. 1 is a diagram illustrating an external appearance of a back side of an information processing apparatus according to an embodiment of the present technology.

FIG. 1 is a diagram illustrating an external appearance of a back side of an information processing apparatus according to an embodiment of the present technology.

An information processing apparatus 1 is a digital camera and has a function of capturing a still image or a moving image. Here, the description will proceed with an example in which the information processing apparatus 1 is applied to a digital camera, but the information processing apparatus 1 can be applied to various kinds of device with a shooting function such as smart phones or tablet terminals.

A lens is installed on the front side of the housing of the information processing apparatus 1, and a display 11 is installed on the back side as illustrated in FIG. 1. A touch panel is disposed to be stacked on the display 11. The user can perform not only an operation using a button disposed around the display 11 but also an operation made by bringing a finger or the like into contact with the surface of the display 11 according to a GUI displayed on the display 11.

When the information processing apparatus 1 is powered on, for example, the information processing apparatus 1 enters the state in which a still image can be captured, and a live view image is displayed on the display 11 as an image being captured. In the example of FIG. 1, an image in which a child sits in a bench and a chair and a table are arranged in front of the child are displayed as a live view image. The user can operate a shutter button (not illustrated) and capture a still image at a desired timing.

The information processing apparatus 1 recognizes a subject captured within a predetermined range including a position on a live view image designated by the user, and presents a shooting setting mode according to the subject's status to the user. The user selects a predetermined mode among from the presented shooting setting modes, and can perform shooting using the selected shooting setting mode. The shooting setting mode is a function for performing a setting related to a captured image of the subject such as correction of brightness or correction of a tone of color.

Figure 2:
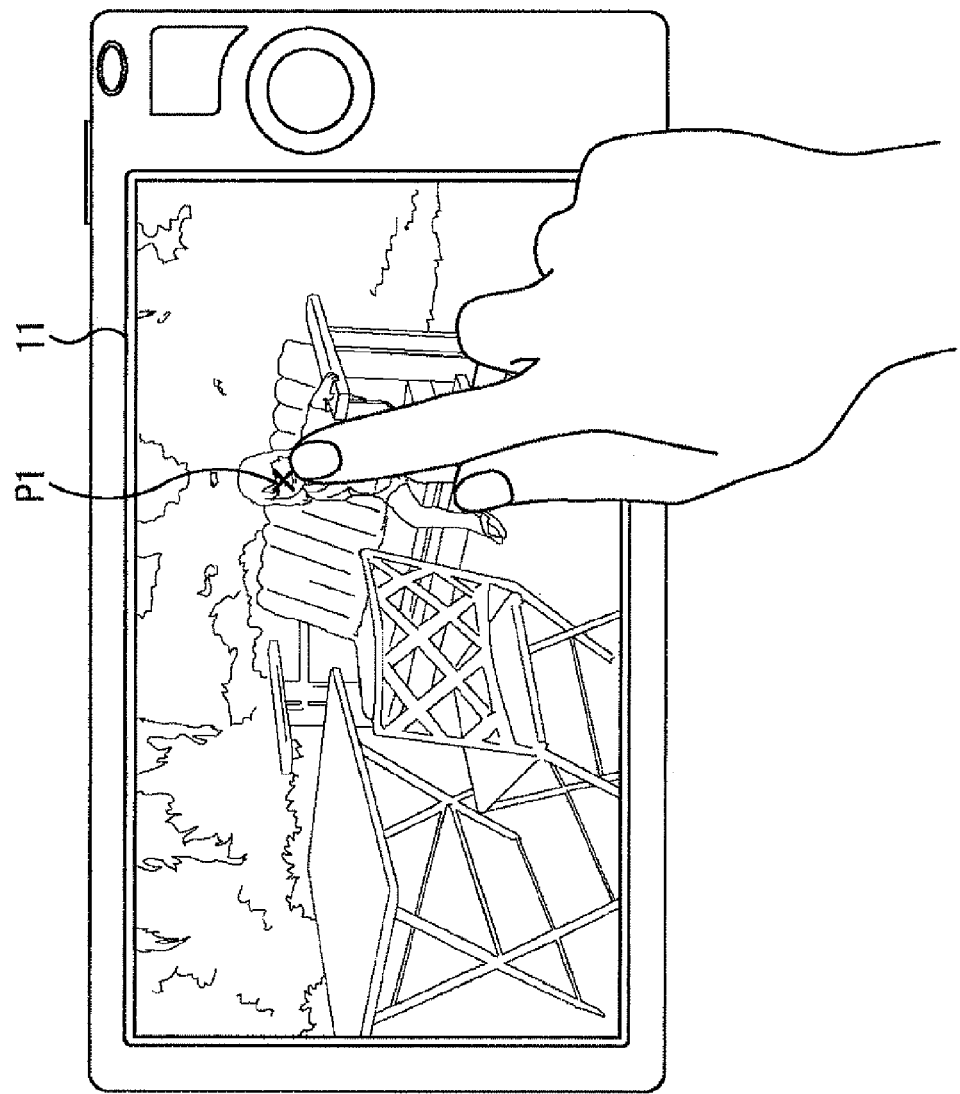
FIG. 2 is a diagram illustrating an exemplary operation of a user.
Figure 3:
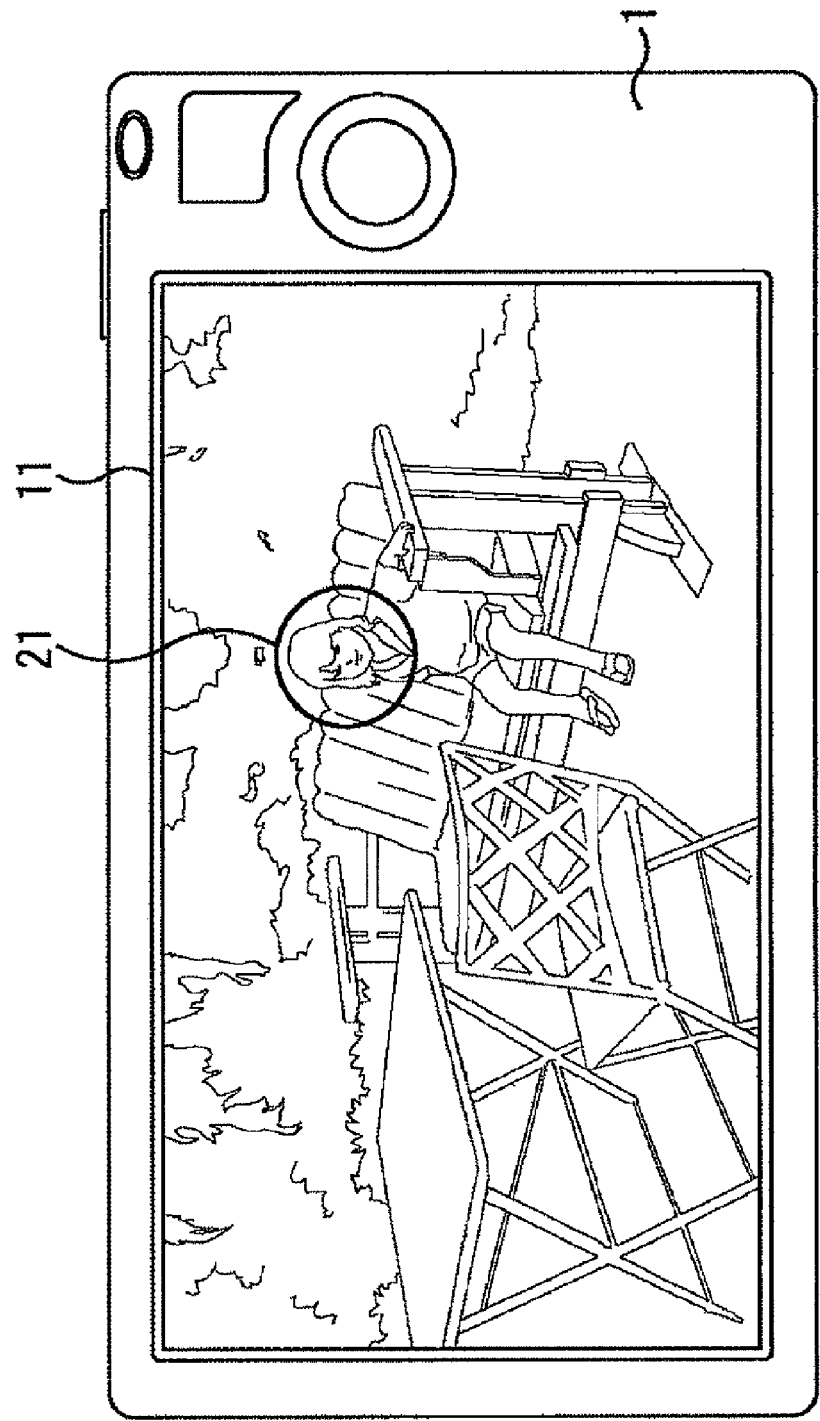
FIG. 3 is a diagram illustrating an exemplary display of a display.

For example, when the user touches (brings a finger in contact with) a position P1 on the live view image as illustrated in FIG. 2, an image 21 feeding back detection of the touch operation is displayed as illustrated in FIG. 3. The position P1 is a position of the child's face shown on the live view image. The image 21 is a circular image of predetermined color such as yellow and displayed to be superimposed on the live view image to surround a predetermined range centering on the position P1. A x mark representing the position P1 is not displayed on the display 11.

The image 21 may also be a frame that surrounds the predetermined range centered on the position P1. The image 21 can also be resized to be larger or smaller using, for example, a pinching gesture. Further, the image 21 need not be circular. The image 21 may also be square, rectangular or any other polygon known in the art. When the image 21 is a shape other than a circle, the resizing thereof may be different in different directions. For example, when the image 21 is a rectangle, a pinch gesture in the horizontal direction may resize the width of the rectangle and a pinch gesture in the vertical direction may resize the height of the rectangle. In addition to resizing, the image 21 may also be moved to another position using a drag gesture. Other variations are also possible without departing from the scope of the present disclosure.

The image 21 is displayed during a short period of time such as one second. During this time, if the image 21 surrounds an incorrect subject or is otherwise at an incorrect position, the selection of the incorrect subject may be canceled by double-tapping the image 21. Alternatively, the selection of the incorrect subject may be canceled by touching and holding the image 21 for a predetermined time interval. Other methods of canceling an incorrect selection are also possible without departing from the scope of the present disclosure.

Figure 4:
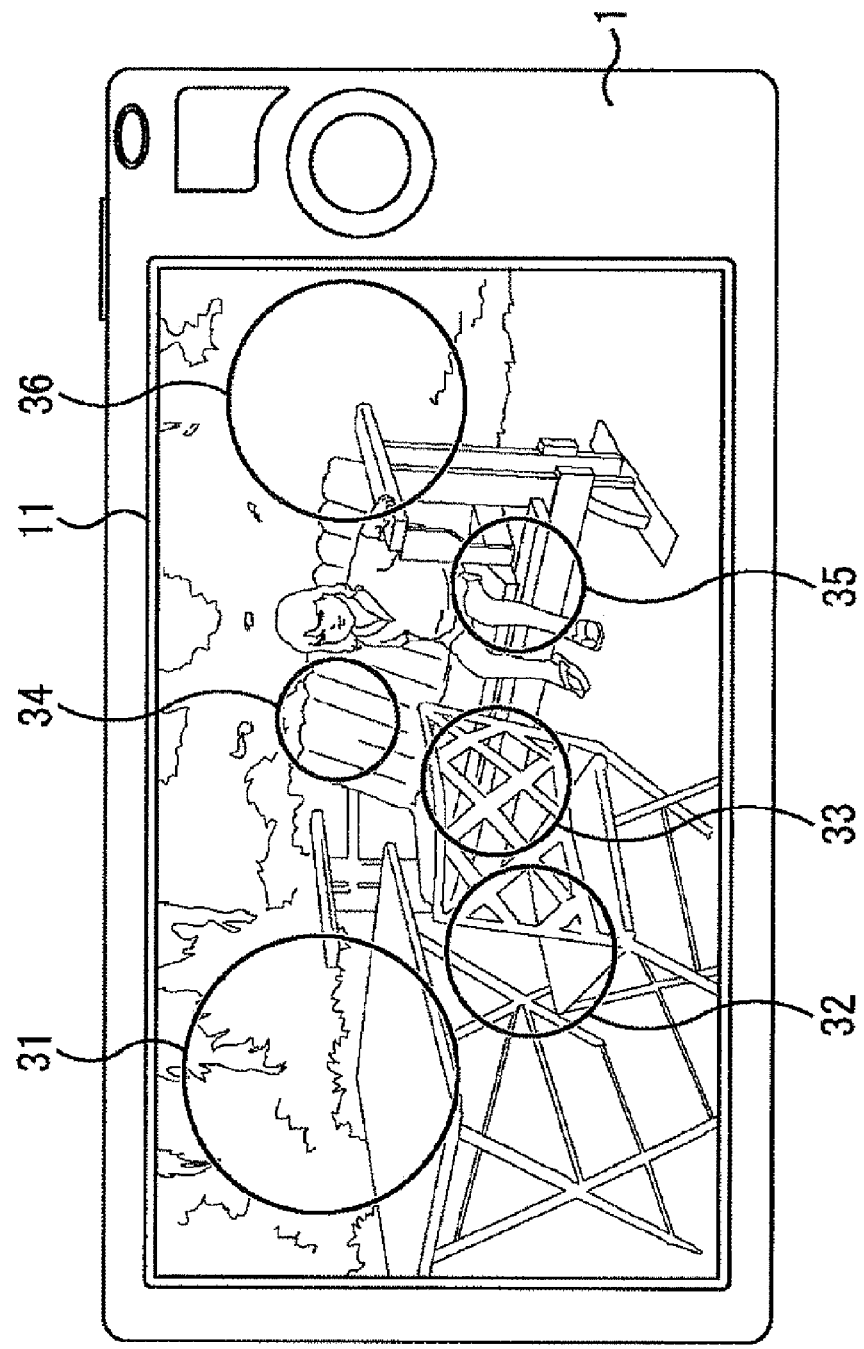
FIG. 4 is a diagram illustrating an exemplary display of a display subsequent to FIG. 3.

If the selection identified by the image 21 is correct, display of the image 21 may be allowed to continue until the short time period elapses. After this short time period elapses, the image 21 disappears and an animation representing that the subject is being recognized is displayed during a predetermined period of time as illustrated in FIG. 4. The animation of FIG. 4 is displayed, for example, such that a plurality of circular images are displayed on the live view image in the superimposed manner while changing the position, the size, and the density. In the status of FIG. 4, images 31 to 36 which are 6 circular images having different sizes are displayed with a color different from the color of image 21 of FIG. 21 at random positions not to overlap one another.

Figure 5:
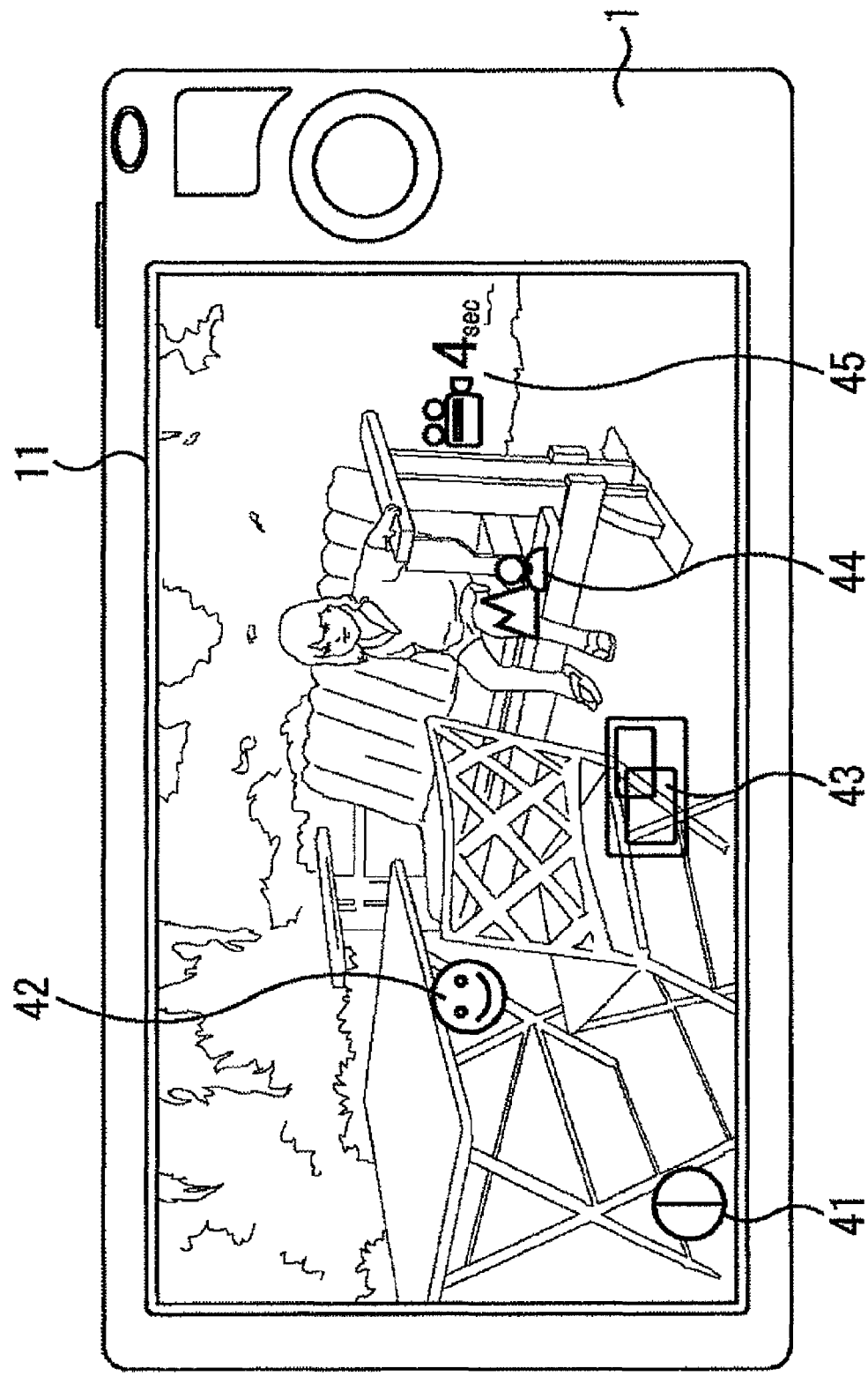
FIG. 5 is a diagram illustrating an exemplary display of a display subsequent to FIG. 4.
Figure 6:
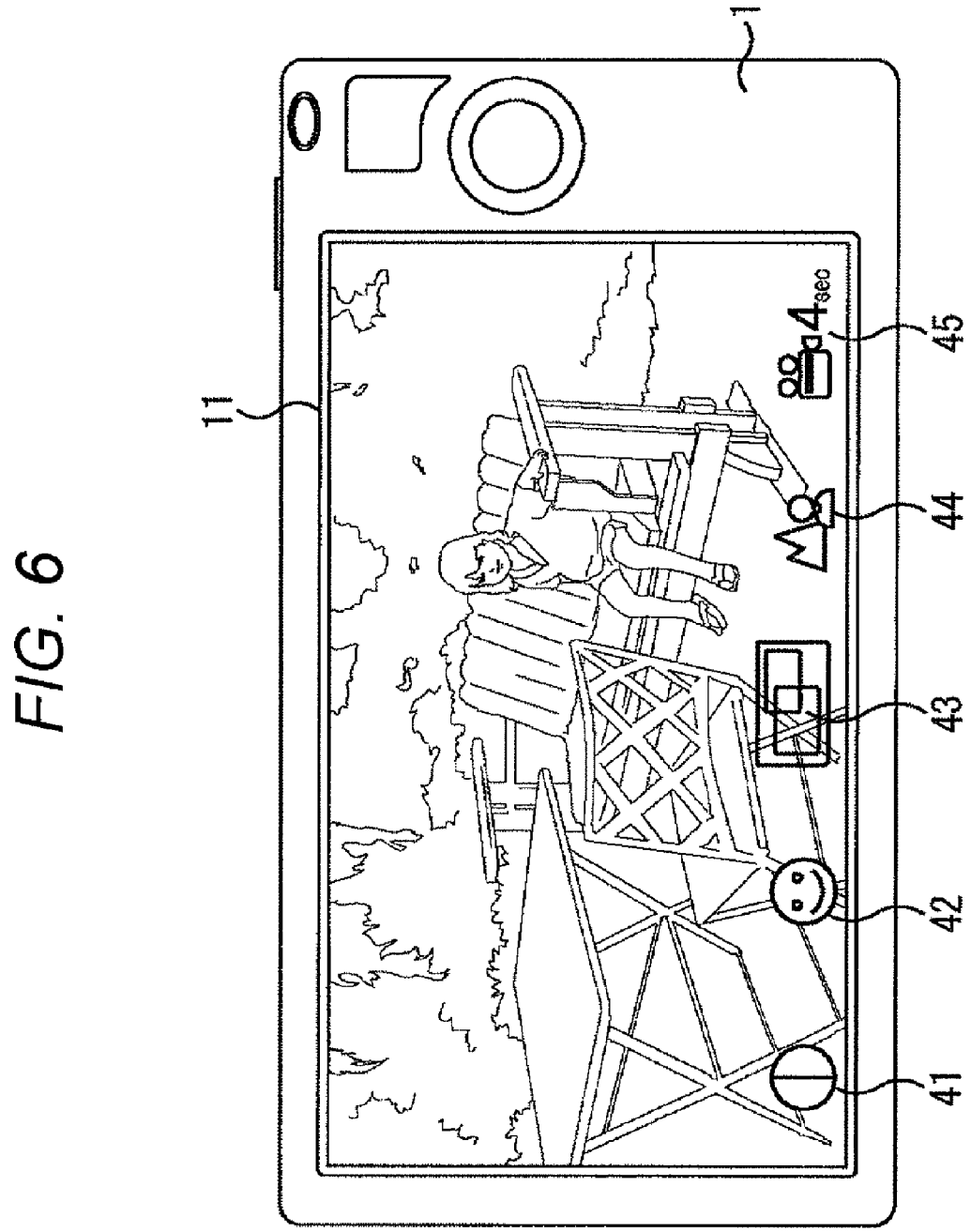
FIG. 6 is a diagram illustrating an exemplary display of a display subsequent to FIG. 5.

When the display of the animation ends, icons 41 to 45 representing the shooting setting mode are displayed on the display 11 as illustrated in FIG. 5. The icons 41 to 45 move downward from current positions (display start positions), and are lined up and displayed along the lower side of the display 11 as illustrated in FIG. 6.

Alternatively, the icons 41 to 45 may move to surround the subject at, for example P1. For example, in FIG. 5 the icons 41 to 45 may move to positions near the face of the child. The icons 41 to 45 may also move to a vertical alignment along the right or left edge of the image, or towards the top of the image. As such, the particular position of the icons 41 to 45 after the animation finishes is not limiting upon the present disclosure.

Figure 7:
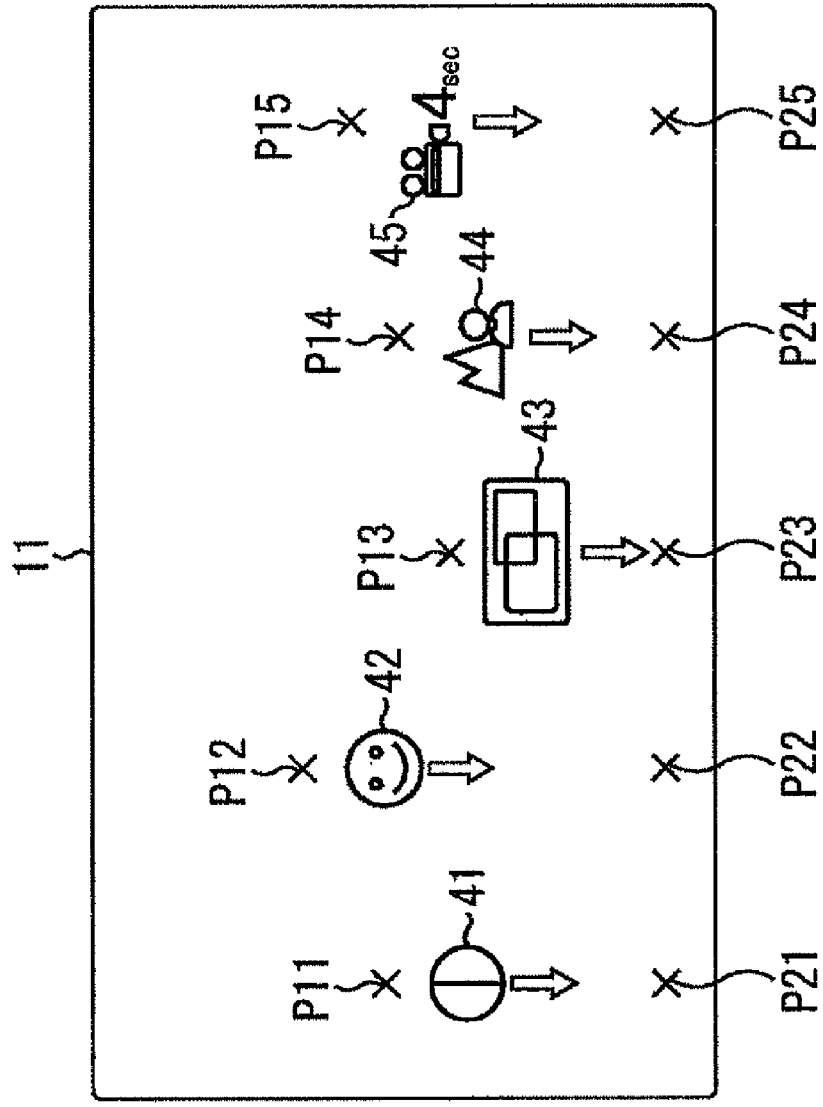
FIG. 7 is a diagram for describing a display of an icon.

FIG. 7 is a diagram for describing a display of the icons 41 to 45. In FIG. 7, the live view image is not illustrated.

The positions P11 to P15 are the current positions of the icons 41 to 45, respectively.

An appearance timing is random, and the icons are displayed at different timings. For example, the icon 41 appearing at the position P11 is displayed to move downward to a position P21 as indicated by a white arrow. Similarly, the icons 42 to 45 are displayed to move downward from the positions P12 to P15 to the positions P21 to P25.

The icons 41 to 45 that have appeared at the positions P11 to P15 move to the positions P21 to P25, are lined up and displayed along the lower side of the display 11, and enters a state in which the user can select a desired icon.

The icon 41 represents monochromatic shooting, and the icon 42 represents a smile shutter. The smile shutter is a function of capturing a still image when a facial expression of a person shown as a subject is a smiling face. The icon 43 represents trimming, and the icon 44 represents a background defocus. The background defocus is a function of lowering a contrast of a background portion of a person captured as a subject and causing the background to blur. The icon 45 represents moving image shooting.

Figure 8:
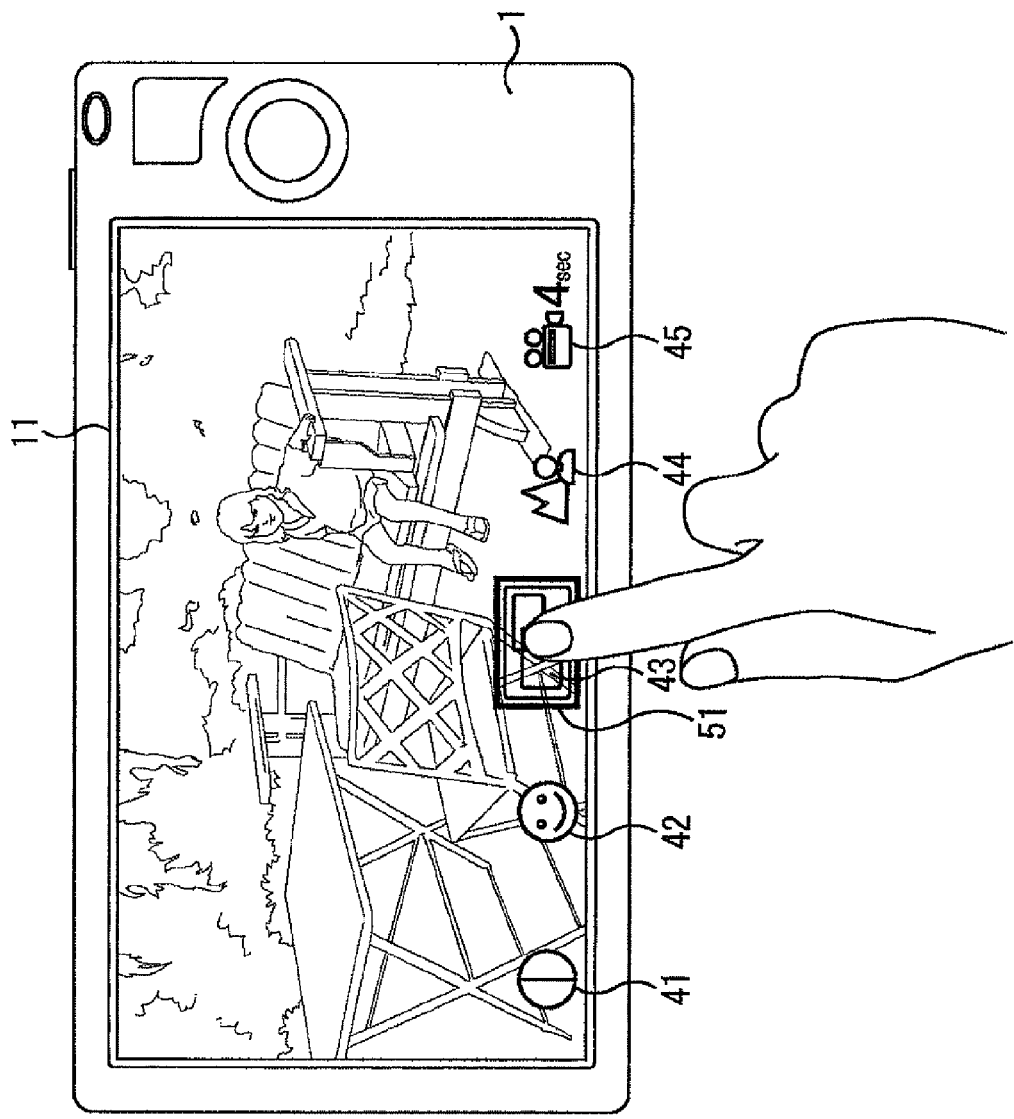
FIG. 8 is a diagram illustrating an exemplary display of a display subsequent to FIG. 6.
Figure 9:
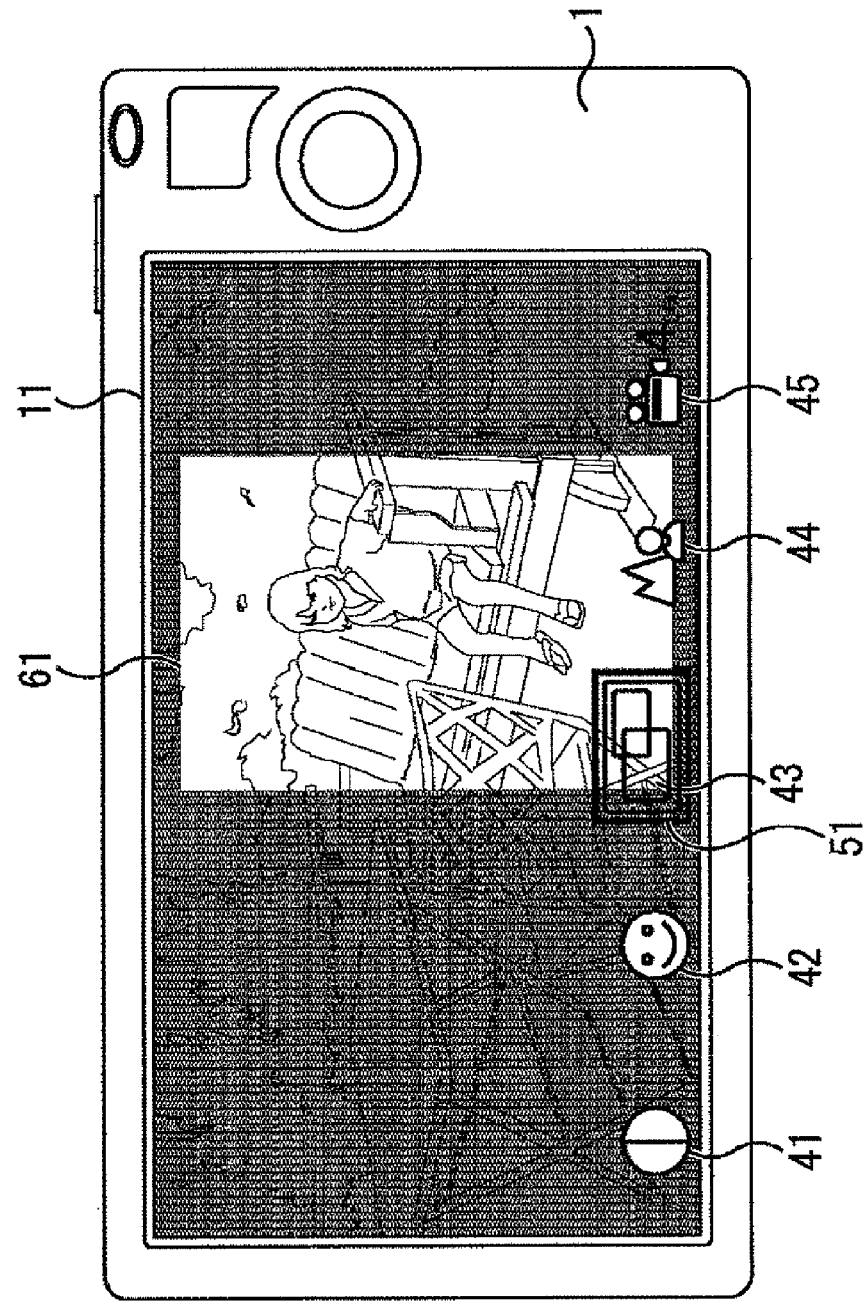
FIG. 9 is a diagram illustrating an exemplary display of a display subsequent to FIG. 8.

As illustrated in FIG. 8, when the user touches the icon 43, a cursor 51 feeding back detection of the touch operation is displayed to surround the icon 43. The trimming function represented by the icon 43 is executed, and a vertical composition represented by a frame 61 in which the child serving as the subject is prominently shown is presented such that the remaining portion is displayed in gray as illustrated in FIG. 9. Frame 61 may be resized and/or moved by the user to encompass a desired subject. For example, a height of the frame 61 may be resized using a pinching gesture in a vertical direction, and a width of the frame 61 may be resized using a pinching gesture in a horizontal direction. When the user pushes the shutter button, a range represented by the frame 61 is clipped from the captured entire image and then recorded as one piece of image.

As described above, the user can cause an icon representing a shooting setting mode according to the subject's status, for example, by designating a subject desired to be captured by a touch operation using a finger. Further, the user can select a predetermined icon and perform a setting related to the captured image of the subject.

Figure 10:
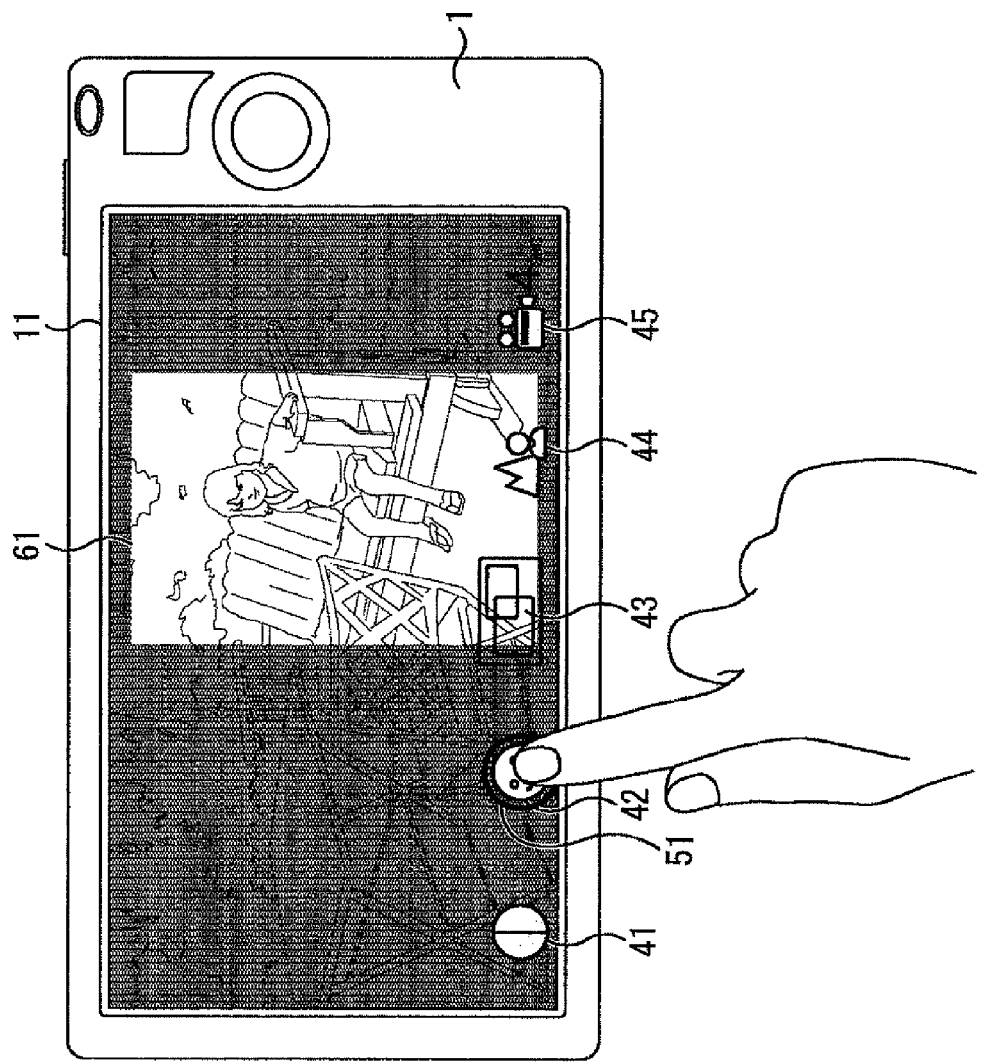
FIG. 10 is a diagram illustrating an exemplary display of a display subsequent to FIG. 9.
Figure 11:
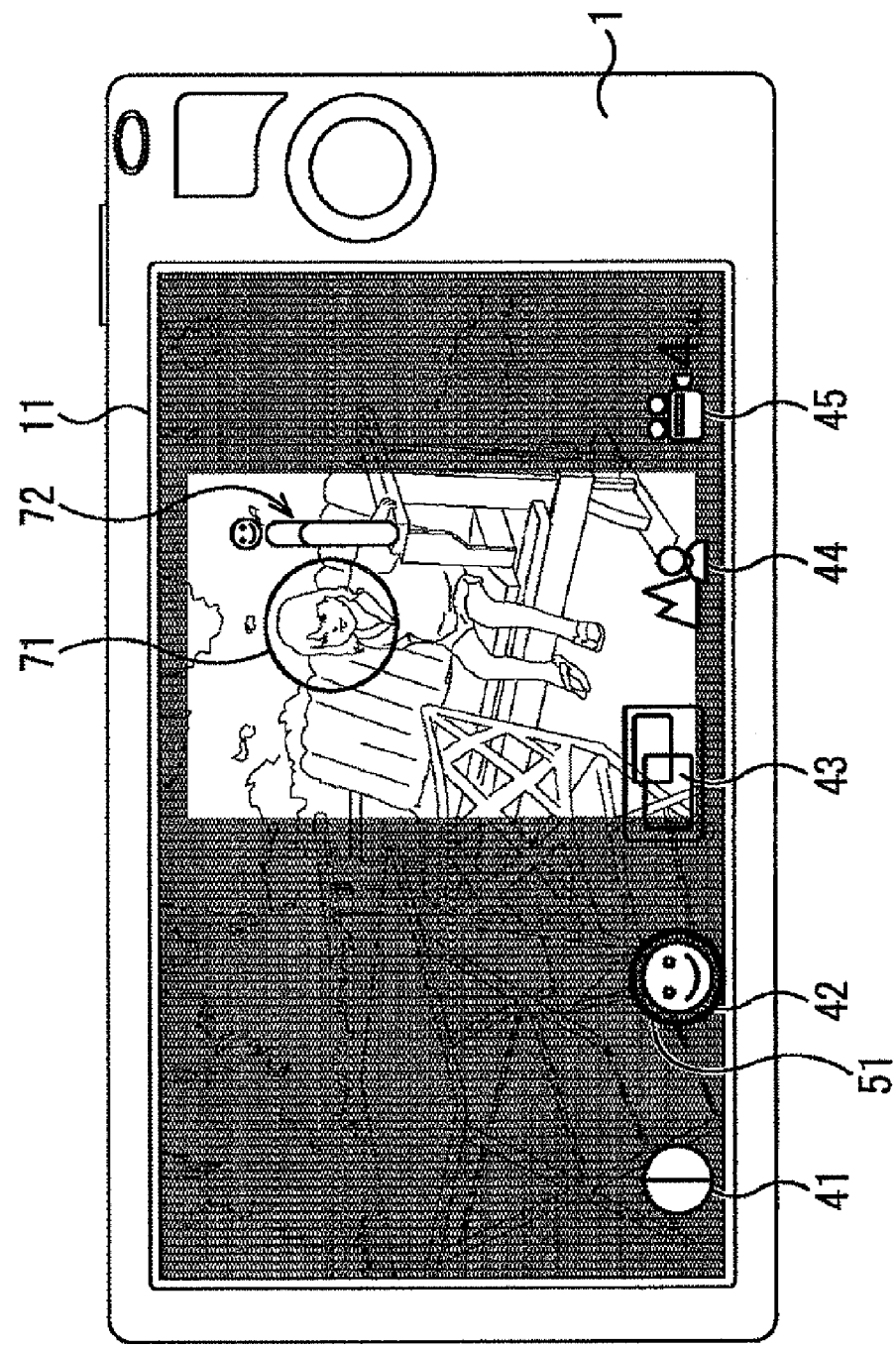
FIG. 11 is a diagram illustrating an exemplary display of a display subsequent to FIG. 10.

As illustrated in FIG. 10, when the user touches the icon 42 subsequent to the icon 43, the cursor 51 feeding back detection of the touch operation is displayed to surround the icon 42. Further, the smile shutter function represented by the icon 42 is executed, and as illustrated in FIG. 11, a circular image 71 is displayed to surround the face of the child captured as the subject, and an indicator 72 representing a degree of a smiling face is displayed at the right side of the image 71. In other words, the information processing apparatus 1 has a face recognition function, that is, a function of recognizing a degree of a smiling face. When the degree of the smiling face exceeds a threshold value, shooting is automatically performed without the user's operation.

As described above, the user can designate a plurality of icons and use a plurality of shooting setting modes in combination.

When the touch panel disposed on the display 11 supports a multi-touch function, the user may be allowed to be able to designate a plurality of positions. In this case, the subject captured within each range including the position designated by the user is recognized, and the shooting setting mode according to each status of the subject is selected. For example, when two positions are designated, a shooting setting mode selected according to a status of a subject captured within a range including one position and a shooting setting mode selected according a status of a subject captured within a range including the other position are lined up and displayed by a predetermined number.

A series of operations of the information processing apparatus 1 of presenting the shooting setting mode to the user according to the above-described GUI will be described later with reference to a flowchart.

Exemplary Configuration of Information Processing Apparatus

Figure 12:
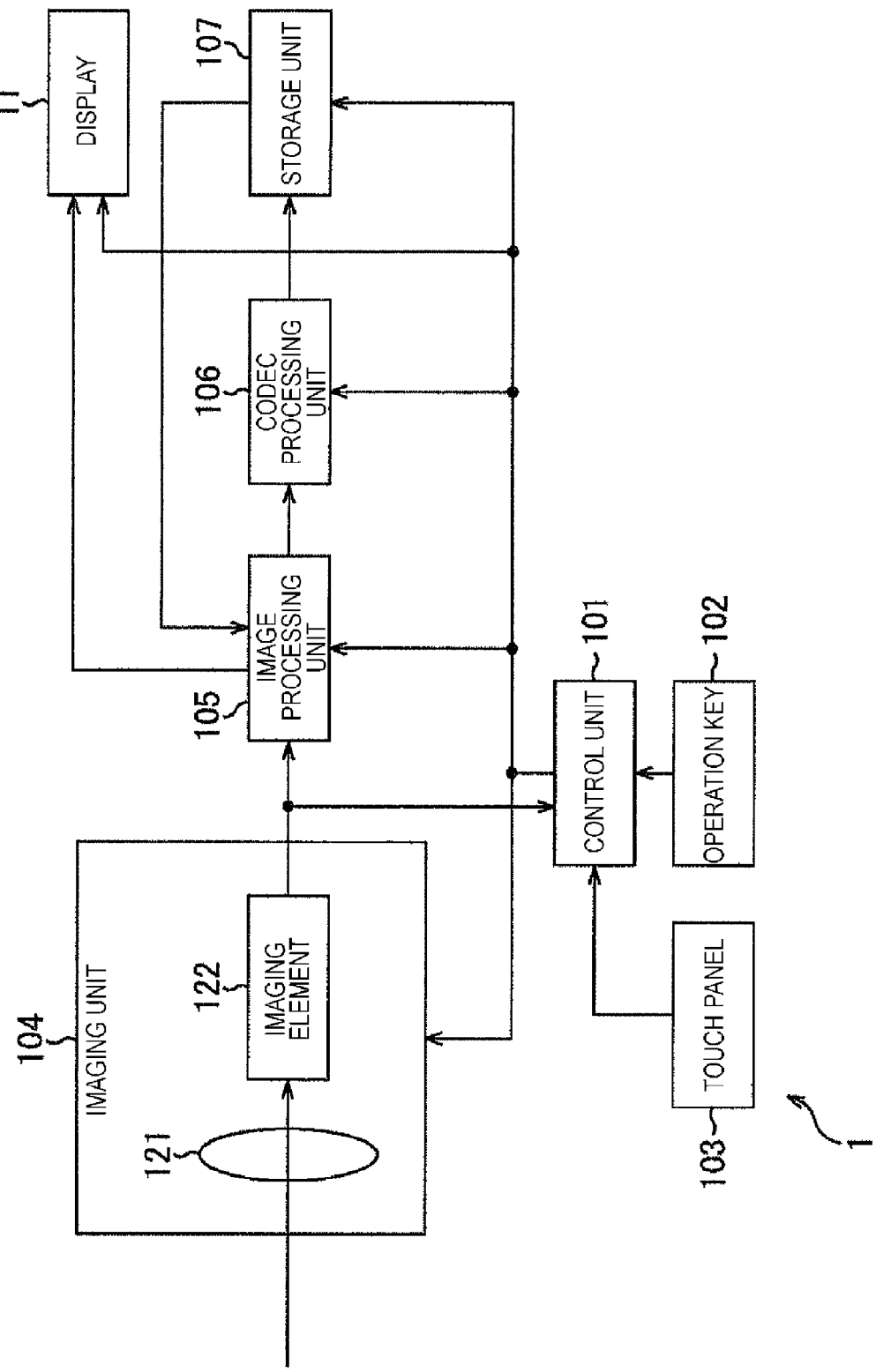
FIG. 12 is a block diagram illustrating an exemplary configuration of an information processing apparatus.

FIG. 12 is a block diagram illustrating an exemplary configuration of the information processing apparatus 1.

The information processing apparatus 1 includes a control unit 101, an operation key 102, a touch panel 103, an imaging unit 104, an image processing unit 105, a codec processing unit 106, and a storage unit 107 in addition to the display 11. The imaging unit 104 includes a lens unit 121 and an imaging element 122.

The control unit 101 includes a CPU (Central Processing Unit), a ROM (Read Only Memory), a RAM (Random Access Memory), and the like. The control unit 101 executes a predetermined program, and controls the components such as the display 11, the imaging unit 104, the image processing unit 105, the codec processing unit 106, and the storage unit 107 in response to a signal supplied from the operation key 102 or the touch panel 103.

The operation key 102 includes a button disposed on the back side of the housing of the information processing apparatus 1, a shutter button disposed on the top face thereof, and the like, and outputs a signal representing content of an operation made by the user to the control unit 101.

The touch panel 103 is configured to be stacked on the display 11, and outputs a signal representing the position touched by the user's finger or the like to the control unit 101.

The lens unit 121 of the imaging unit 104 is configured with an imaging optical system such as a lens or the like. The lens unit 121 is driven according to control of the control unit 101, and guides light from the subject to the imaging element 122.

The imaging element 122 is, for example, an imaging element of a CMOS (Complementary Metal Oxide Semiconductor) type. The imaging element 122 performs photoelectric conversion on light from the lens unit 121, executes A/D conversion on a signal according to intensity of light, and outputs a conversion result to the image processing unit 105.

The image processing unit 105 executes various kinds of image processing such as a white balance adjustment process on an image signal supplied from the imaging element 122. The image processing unit 105 outputs the image signal obtained by executing image processing to the display 11 configured with a LCD (Liquid Crystal Display) or the like and the codec processing unit 106.

The codec processing unit 106 executes an encoding process on the image signal from the image processing unit 105, and supplies image data to the storage unit 107.

The storage unit 107 is configured with a memory card or the like, and records the image data supplied from the codec processing unit 106.

Figure 13:
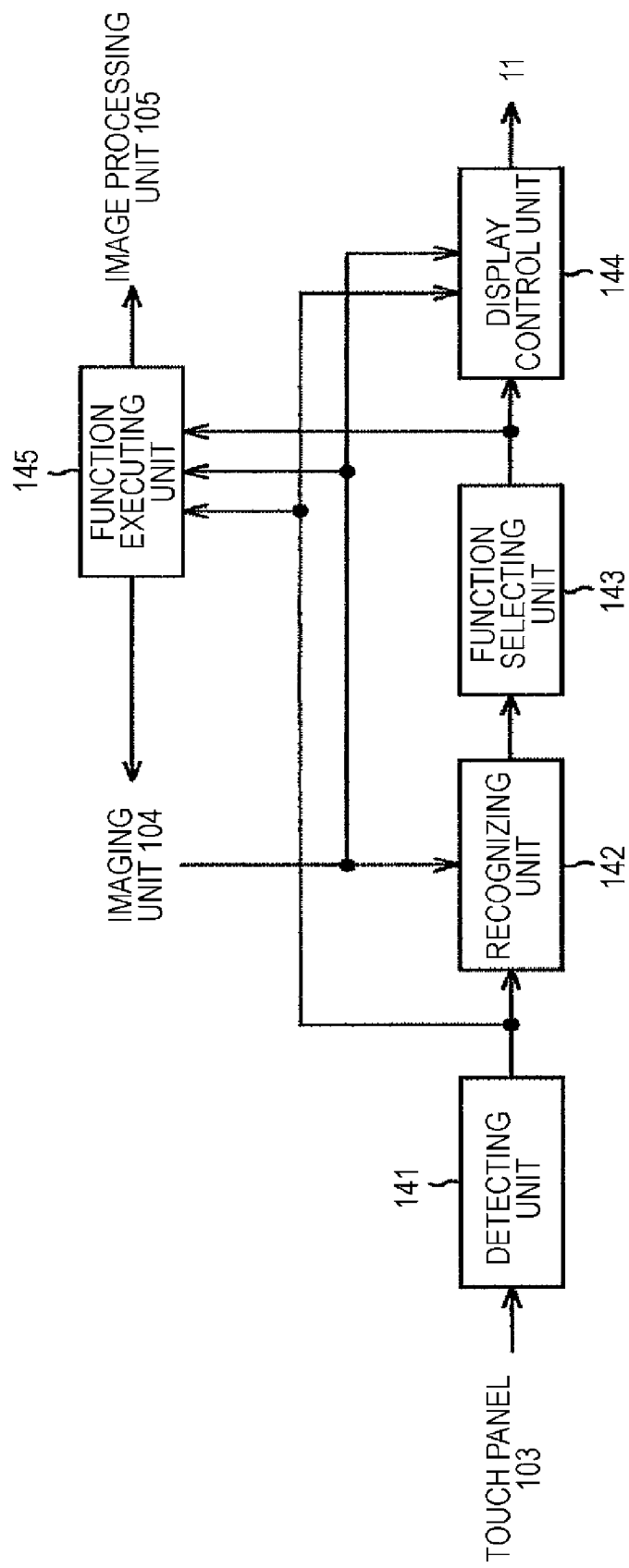
FIG. 13 is a block diagram illustrating an exemplary functional configuration of an information processing apparatus.

FIG. 13 is a block diagram illustrating an exemplary functional configuration of the information processing apparatus 1. At least one of functional units illustrated in FIG. 13 is implemented by executing a predetermined program through the control unit 101 of FIG. 12.

In the information processing apparatus 1, a detecting unit 141, a recognizing unit 142, a function selecting unit 143, a display control unit 144, and a function executing unit 145 are implemented. A signal from the touch panel 103 is input to the detecting unit 141, and an image captured by the imaging unit 104 is input to the recognizing unit 142, the display control unit 144, and the function executing unit 145.

The detecting unit 141 detects a position touched by the user based on a signal supplied from the touch panel 103, and outputs a signal representing the touched position. The signal output from the detecting unit 141 is supplied to the recognizing unit 142, the display control unit 144, and the function executing unit 145.

The recognizing unit 142 specifies the position designated by the user's touch operation among the positions on the live view image supplied from the imaging unit 104 based on the signal supplied from the detecting unit 141. The recognizing unit 142 recognizes a subject captured within a predetermined range including the position designated by the user and the subject's status.

For example, the recognizing unit 142 analyzes image data with a predetermined range including the position designated by the user in the entire live view image, and extracts the subject's feature. The recognizing unit 142 recognizes the subject by matching the extracted feature with feature data of a recognition target which is prepared in advance.

For example, the recognizing unit 142 recognizes a person captured as the subject, and data used to recognize a person's face, facial expression, sex, age, and dress is prepared. Further, data used to recognize flowers or buildings captured as the subject is prepared.

When a person is recognized as the subject, the recognizing unit 142 outputs information representing a sex and an age of the person, the number of people, and dress of a person and information representing a position of a face and a facial expression to the function selecting unit 143 as the recognition result together with information representing that the person is the subject. Further when a flower is recognized as the subject, the recognizing unit 142 outputs information representing color of the flower captured as the subject, the number of flowers, the distance from the flower (the distance between the information processing apparatus 1 and the flower), and the position of the flower to the function selecting unit 143 as the recognition result together with information representing that the flower is the subject. Further, when a building is recognized as the subject, the recognizing unit 142 outputs information representing the shape of the building captured as the subject, a tone or color of the building, and the position of the building to the function selecting unit 143 as the recognition result together with information representing that the building is the subject.

Further, information of brightness of an entire image, information representing whether or not a shooting environment is against the sun, and the like are supplied from the recognizing unit 142 to the function selecting unit 143. A subject serving as a recognition target may be a subject captured within a range of a part of the live view image or may be a subject captured in the entire live view image.

The function selecting unit 143 select the shooting setting mode corresponding to the subject recognition result based on the information supplied from the recognizing unit 142. For the function selecting unit 143, information representing a correspondence relation between the subject recognition result and the shooting setting mode is prepared.

FIG. 14 is a diagram illustrating an exemplary correspondence relation between the subject recognition result and the shooting setting mode.

When a person is the subject, a predetermined shooting setting mode is selected from among background defocus, skin correction, trimming, a smile shutter, backlight correction, a flash mode, moving image shooting, and monochromatic shooting according to the recognition result obtained by the recognizing unit 142. FIGS. 5 to 11 illustrate an example in which a shooting setting mode such as a monochromatic shooting, a smile shutter, trimming, a background defocus, or moving image shooting is selected based on the information.

Further, when a flower is the subject, a predetermined shooting setting mode is selected from among a focus mode, a focus bracket, a tone of color, a chroma, brightness, a part color, trimming, and moving image shooting according to the recognition result obtained by the recognizing unit 142. For example, the focus mode is a mode for performing a setting such as macro shooting of focusing on a near subject, and the part color is a mode of displaying only a region of a certain color in color and displaying a region of the other colors in black and white. When a building is the subject, a predetermined shooting setting mode is selected from among a background defocus, dynamic range expansion, backlight correction, a tone of color, and monochromatic shooting according to the recognition result obtained by the recognizing unit 142.

The subject serving as the recognition is not limited to people, flowers, and a buildings. For example, the landscape, evening views, night views, fireworks, or the like may be recognized. Further, the subject is not limited to a subject in a stationary status, and a moving subject such as a person playing a sport may be recognized. In this case, predetermined shooting setting mode is selected from among a continuous shooting mode, a mode for adjusting white balance, and a mode for adjusting sensitivity according to color, brightness, a degree of movement, or the like.

The function selecting unit 143 outputs information representing the selected shooting setting mode to the display control unit 144 and the function executing unit 145.

The display control unit 144 controls a display of the display 11 described above with reference to FIGS. 1 to 11. For example, the display control unit 144 displays the live view image based on the image signal supplied from the imaging unit 104, and when the user's touch operation is detected by the detecting unit 141, the image 21 of FIG. 3 representing a feedback or the cursor 51 of FIG. 8 is displayed. Further, when information representing the shooting setting mode is supplied from the function selecting unit 143, the display control unit 144 causes an icon representing the shooting setting mode to be displayed on the display 11.

Figure 15:
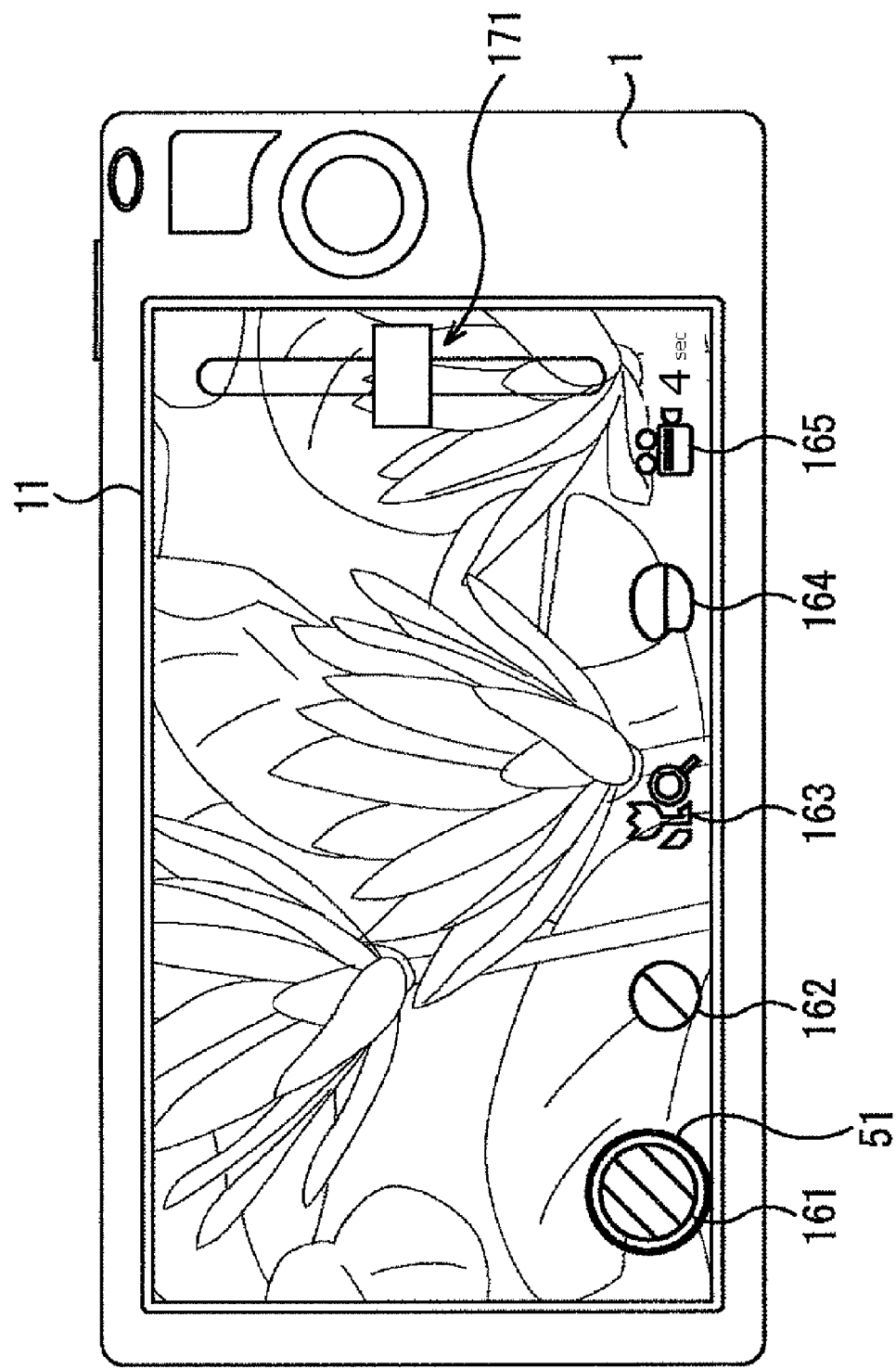
FIG. 15 is a diagram illustrating an exemplary display of an icon.

FIG. 15 is a diagram illustrating an exemplary display of an icon.

When a flower is recognized as the subject, the display control unit 144 displays icons 161 to 165 based on the selection result by the function selecting unit 143. The icon 161 represents a function for performing a setting of a tone of color, and the icon 162 represents a function for performing a chroma setting. The icon 163 represents a focus mode, and the icon 164 represents a part color. The icon 165 represents moving image shooting.

In FIG. 15, for example, when the user selects the icon 161 to be surrounded by the cursor 51, an adjusting bar 171 is displayed as illustrated on the right side of the screen. The user can perform a setting of a tone of color using the adjusting bar 171. When the adjusting bar 171 is operated, the image processing unit 105 adjusts a tone of color of the live view image according to control of the function executing unit 145, and then the live view image having the adjusted tone of color is displayed on the display 11.

Figure 16:
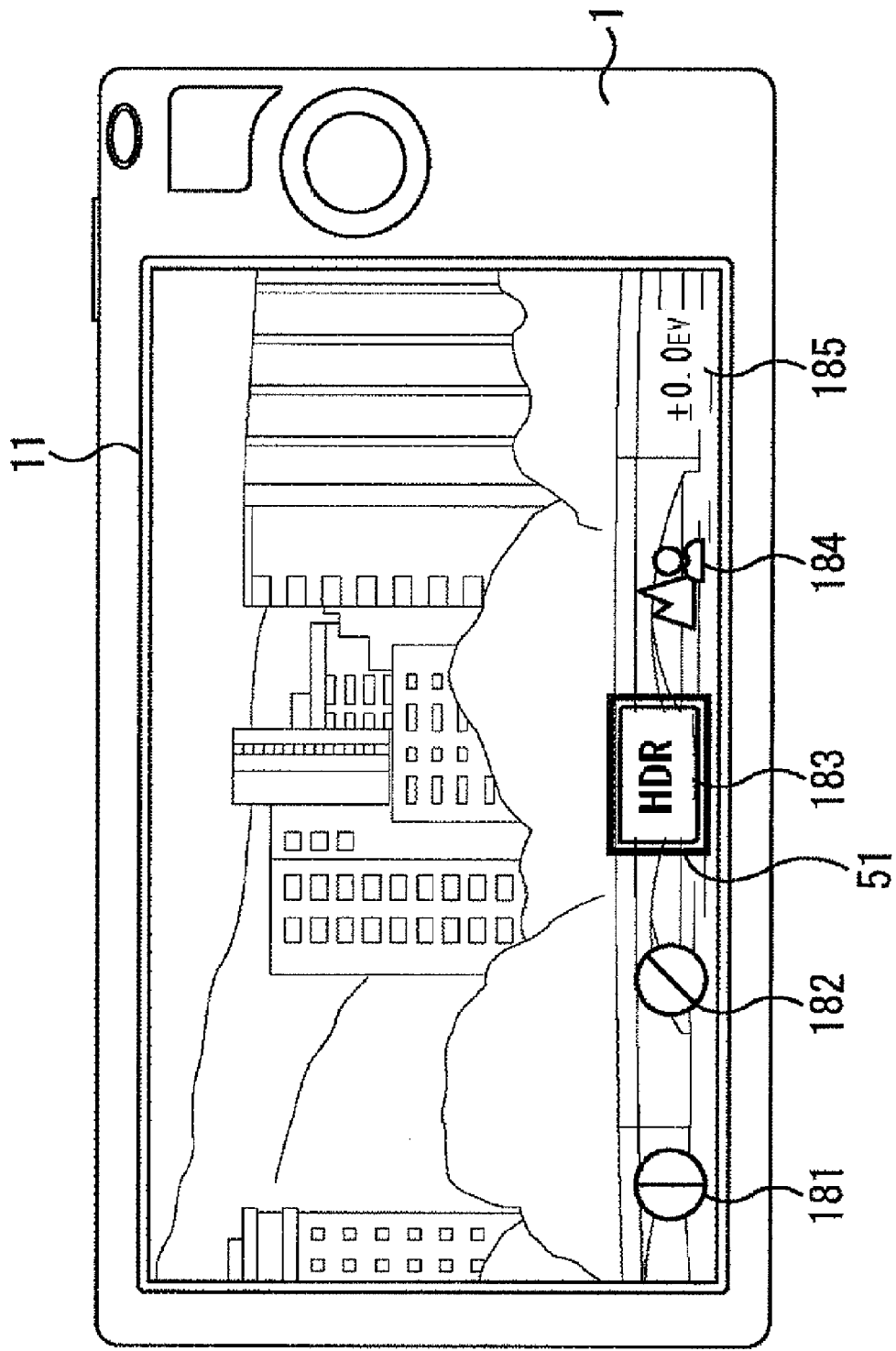
FIG. 16 is a diagram illustrating another exemplary display of an icon.

FIG. 16 is a diagram illustrating another exemplary display of an icon.

When a building is recognized as the subject, the display control unit 144 displays icons 181 to 185 based on the selection result by the function selecting unit 143. The icon 181 represents monochromatic shooting, and the icon 182 represents a function for performing a chroma setting. The icon 183 represents dynamic range expansion, and the icon 184 represents a background defocus. The icon 185 represents a function for performing a brightness setting.

Referring back to FIG. 13, the function executing unit 145 executes the shooting setting mode selected by the user touching an icon among the shooting setting modes selected by the function selecting unit 143. For example, when the user selects the shooting setting mode of trimming, the function executing unit 145 controls the image processing unit 105 such that trimming is performed. Further, when the user selects the shooting setting mode of the smile shutter, the function executing unit 145 specifies the smiling face degree of the user based on the recognition result obtained by the recognizing unit 142, and controls the imaging unit 104 such that shooting is performed when the smiling face degree exceeds a threshold value or more.

Operation of Information Processing Apparatus

Figure 17:
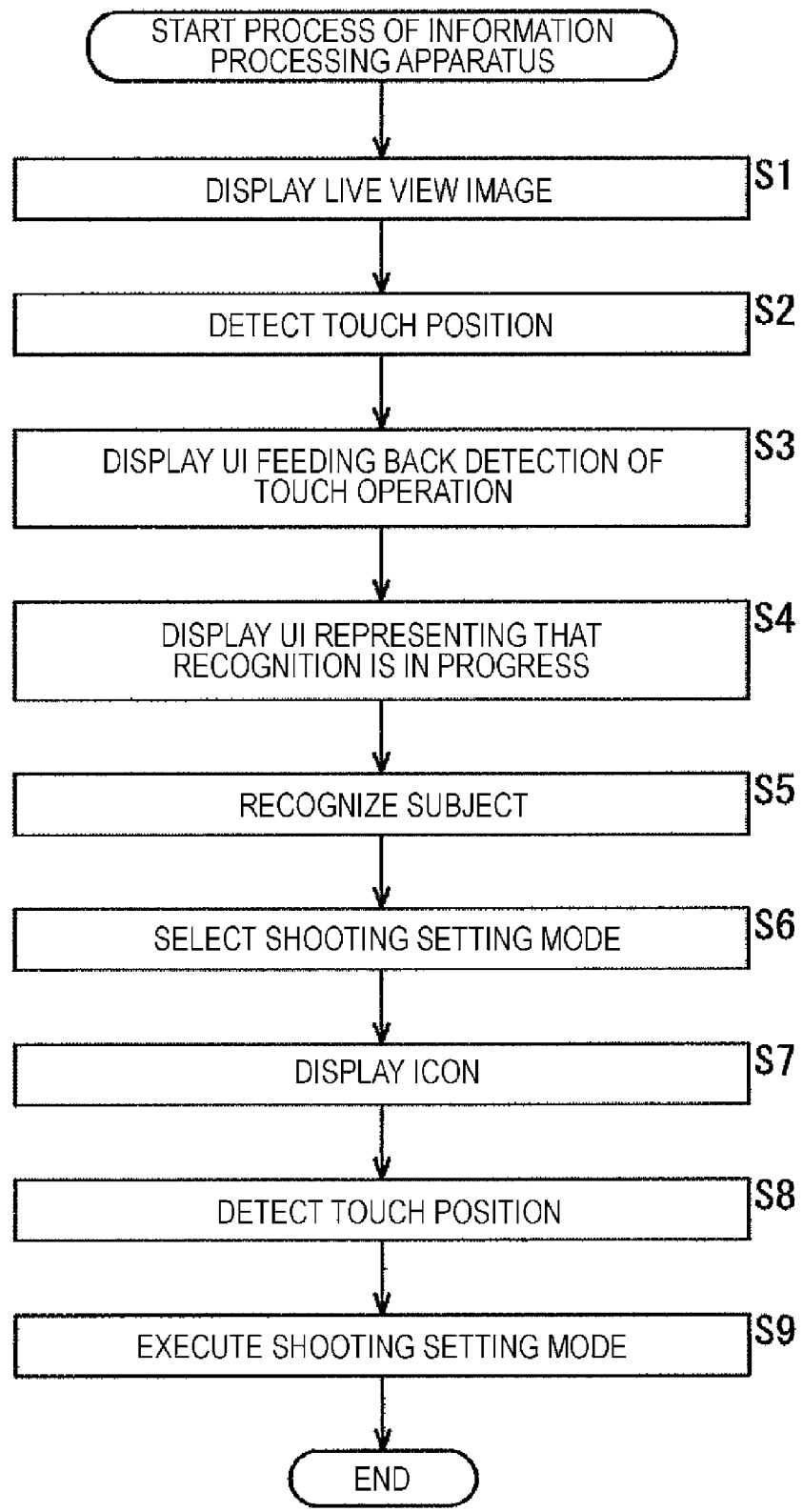
FIG. 17 is a flowchart for describing an operation of an information processing apparatus.

An operation of the information processing apparatus 1 having the above-described configuration will be described with reference to a flowchart of FIG. 17. For example, the process of FIG. 17 starts when the user causes the information processing apparatus 1 to be powered on. When the information processing apparatus 1 is powered on, the status of the information processing apparatus 1 enters a still image shooting status, and shooting starts by the imaging unit 104.

In step S1, the display control unit 144 causes an image captured by the imaging unit 104 to be displayed on the display 11 as a live view image.

When the user touches a position on the live view image by a finger, in step S2, the detecting unit 141 detects the position touched by the user.

In step S3, the display control unit 144 causes an image (UI) for feeding back detection of the touch operation to be displayed on the display 11.

In step S4, the display control unit 144 causes an animation representing that a subject is being recognized to be displayed on the display 11.

In step S5, the recognizing unit 142 analyzes the live view image recognizes a subject captured within a predetermined range including the position designated by the user and the subject's status.

In step S6, the function selecting unit 143 selects a shooting setting mode according to the subject recognition result obtained by the recognizing unit 142.

In step S7, the display control unit 144 causes an icon representing the shooting setting mode selected by the function selecting unit 143 to be displayed on the display 11.

In step S8, the detecting unit 141 detects a position touched by the user.

In step S9, the function executing unit 145 specifies an icon touched by the user, and executes a shooting setting mode selected by the user. Thereafter, the process ends.

Through the above-described process, the user can perform various kinds of setting according to the subject's status on which the user desires to perform shooting. Since the shooting setting mode is basically used for a setting a single parameter related to the captured image of the subject such as a setting of brightness or a setting of a tone of color, a detailed setting can be performed compared to when a plurality of parameters are set together.

Further, since an appropriate shooting setting mode is automatically selected according to the subject's status, the user can perform a setting more easily than when a function is selected from a menu screen in which items are hierarchized.

Modified Example

In the above embodiment, a series of processes are assumed to be performed in a digital camera, but some processes such as recognition of a subject or selection of a shooting setting mode may be performed in another device that has received information from the digital camera.

In this case, another device such as a mobile terminal or a server on a network, which is capable of performing communication with the digital camera receives a live view image transmitted from the digital camera or information related to the user's operation, and performs recognition of a subject or selection of a shooting setting mode. Further, another device transmits information of a selected shooting setting mode to the digital camera and causes an icon to be displayed on the digital camera.

The series of processes may be executed by hardware or software. When the series of processes are executed by software, a program configuring the software is installed, for example, in a computer in which dedicated hardware is incorporated or a general-purpose personal computer from a program recording medium.

Figure 18:
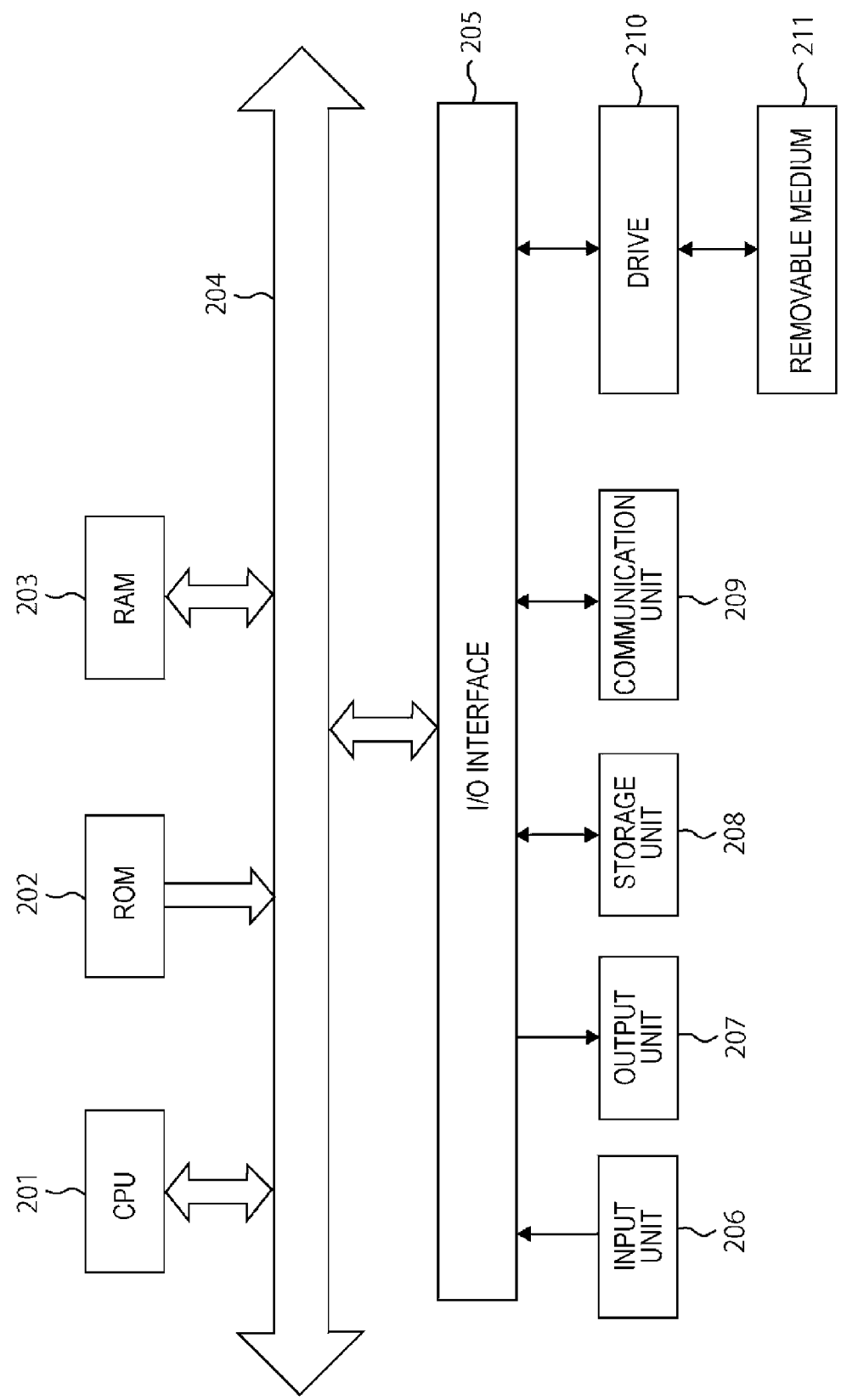
FIG. 18 is a block diagram illustrating an exemplary configuration of a computer.

FIG. 18 is a block diagram illustrating an exemplary configuration of hardware of a computer that executes the above-described series of processes through a program.

A CPU (Central Processing Unit) 201, a ROM (Read Only Memory) 202, and a RAM (Random Access Memory) 203 are connected to one another via bus 204.

Further, an input/output (I/O) interface 205 is connected to the bus 204. An input unit 206 such as a keyboard or a mouse and an output unit 207 such as a display or a speaker are connected to the I/O interface 205. Further, a storage unit 208 such as a hard disk or a non-volatile memory, a communication unit 209 such as a network interface, and a drive 210 driving a removable medium 211 are connected to the I/O interface 205.

In computer having the above-described configuration, the above-described series of processes are performed such that the CPU 201 causes, for example, a program stored in the storage unit 208 to be loaded to the RAM 203 through the I/O interface 205 and the bus 204 and executes the program.

For example, the program executed by the CPU 201 is recorded in the removable medium 211, provided through a wired or wireless transmission medium such as a local area network (LAN), the Internet, or digital broadcasting, and installed in the storage unit 208.

The program executed by the program may be a program in which a process is performed in time series according to the sequence described in this disclosure or may be a program in which a process is performed in parallel or a necessary timing such as a called timing.

The exemplary embodiment of the present technology is not limited to the above embodiment, and various changes can be made within the scope not departing from the gist of present technology.

For example, the present technology may have a configuration of a cloud computing in which a plurality of devices share and jointly perform a single function via a network.

Further, steps described in the above flowchart are executed by a single device but may be shared and executed by a plurality of devices.

In addition, when a plurality of processes are included in single step, a plurality of processes included in single step may be executed by a single device or may be shared and executed by a plurality of devices.

Exemplary Configuration of Configuration

The present technology may have the following configuration.

(1) A method for an information processing apparatus, comprising: causing display of an image; recognizing, in a processor, a subject in a selected portion of the image; identifying image settings modes based on the subject recognized in the selected portion of the image; causing display of icons corresponding to the image setting modes identified; and specifying one of the image setting modes based on selection of one of the icons.

(2) The method of (1), further comprising executing the specified image setting mode.

(3) The method according of any one of (1) to (2), wherein the information processing apparatus comprises a touch screen, and the selected portion of the image is selected based on a touch position on the touch screen.

(4) The method according of any one of (1) to (3), further comprising: causing display of an identification of the selected portion of the image based on the touch position on the touch screen.

(5) The method of any one of (1) to (4), wherein the identification of the selected portion of the image is a colored region overlaid on the selected portion of the image.

(6) The method of any one of (1) to (5), wherein the icons corresponding to the image setting modes are displayed after the animation of the plurality of colored regions.

(7) The method of any one of (2) to (6), further comprising: causing display of a frame around the selected portion of the image in response to execution of the specified image setting mode when the specified image setting mode is a trimming mode.

(8) The method of any one of (2) to (7), further comprising: specifying another of the image setting modes based on selection of another one of the icons; executing the other image setting mode to cause display of a frame around a sub-portion of the selected portion of the image.

(9) The method of any one of (2) to (8), wherein the sub-portion of the selected portion of the image includes a face of the subject, and the frame surrounds the face.

(10) The method of any one of (2) to (9), further comprising: causing the image to be captured when the degree of smiling of the face exceeds a predetermined threshold.

(11) The method of (3), further comprising: selecting at least a first portion and a second portion of the image based on at least two touch positions on the touch screen; identifying a first set of image setting modes corresponding to the first portion of the image; identifying a second set of image setting modes corresponding to the second portion of the image; and specifying at least one of an image setting mode for the first portion of the image based on the first set of image setting modes and an image setting mode for the second portion of the image based on the second set of image setting modes.

(12) The method of (2), further comprising: causing display of an adjustment control on the image in response to execution of the specified image setting mode.

(13) The method of any one of (2), further comprising: adjusting a parameter of the selected portion of the image based on operation of the adjustment control.

(14) The method of any one of (12) to (13), wherein the parameter includes a color tone, a chroma setting, a focus mode and a color part setting.

(15) The method of any one of (1) to (14), further comprising: causing display of a cursor frame that surrounds the selected icon when the selected icon is selected.

(16) The method of any one of (1) to (15), wherein different image setting modes are identified based on whether the subject is a person, a building or a plant.

(17) The method of any one of (1) to (16), wherein the image setting modes include at least one of a trimming mode, a smiling recognition mode, an expanded dynamic range mode, a background defocus mode, and a monochromatic shooting mode.

(18) A non-transitory computer-readable medium storing computer-readable instructions thereon, the computer-readable instructions when executed by a computer cause the computer to perform a method comprising: causing display of an image; recognizing a subject in a selected portion of the image; identifying image settings modes based on the subject recognized in the selected portion of the image; causing display of icons corresponding to the image setting modes identified; and specifying one of the image setting modes based on selection of one of the icons.

(19) An information processing system, comprising: a touch screen display to display an image and to receive selection of a portion of the image; and a processor configured to cause display of the image, recognize a subject in the selected portion of the image, identify image settings modes based on the subject recognized in the selected portion of the image, cause display of icons corresponding to the image setting modes identified, and specify one of the image setting modes based on selection of one of the icons.

(20) An information processing apparatus, comprising: a touch screen display unit configured to display an image and configured to receive selection of a portion of the image; and a processor configured to cause display of the image on the touch screen display, recognize a subject in the selected portion of the image, identify image setting modes based on the subject recognized in the selected portion of the image, cause display of icons corresponding to the image setting modes identified, and specify one of the image setting modes based on selection of one of the icons.

(21) The method of (5), further comprising: resizing the colored region based on a pinch gesture on the touch screen.

(22) The method of (21), wherein a height of the colored region is resized when the pinch gesture is in a vertical direction, and the width of the colored region is resized when the pinch gesture is in a horizontal direction.

(23) The method of any one of (5) to (22), further comprising: canceling selection of the select portion of the image based on a canceling gesture on the touch screen.

(24) The method of (23), wherein the canceling gesture is a double-tap.

(25) The method of (23), wherein the canceling gesture is a touch for a predetermined length of time.

(26) The method of (1), further comprising: displaying the icons adjacent to the subject in the selected portion of the image.

(27) The method of (26), wherein the icons surround the subject in the selected portion of the image.

(28) The method of any one of (8) to (11), further comprising: resizing the frame based on a pinching gesture in the touch screen.

(29) The method of (28), wherein a height of the frame is resized when the pinching gesture is in a vertical direction.

(30) The method of (28), wherein a width of the frame is resized when the pinching gesture is in a horizontal direction.

(31) The method of any one of (8) to (11), further comprising moving the frame based on a dragging gesture on the touch screen.

Additionally, the present technology may also be configured as below.

(1) An information processing apparatus, including:
a detecting unit that detects a position on an image designated by a user;
a recognizing unit that recognizes a subject captured within a range including the detected position;
a selecting unit that selects a plurality of functions for performing setting related to a captured image of the subject according to a recognition result of the subject; and a display control unit that causes an icon representing the selected functions to be displayed to be superimposed on the image.

(2) The information processing apparatus according to (1), further including, an imaging unit,
wherein the detecting unit detects a position on a live view image captured by the imaging unit.

(3) The information processing apparatus according to (1) or (2),
wherein the recognizing unit recognizes the subject captured within a range of a part of the image.

(4) The information processing apparatus according to any one of (1) to (3),
wherein the detecting unit detects a plurality of positions designated by the user,
the recognizing unit recognizes the subject captured within each of ranges including the detected positions, and
the selecting unit selects the functions according to a plurality of subject recognition results.

(5) The information processing apparatus according to any one of (1) to (4),
wherein when the icon is selected, the display control unit displays an operation image used to perform a setting related to the captured image of the subject through the function represented by the selected icon.

(6) The information processing apparatus according to any one of (1) to (5), further including,
an image processing unit that changes the captured image of the subject according to the setting performed using the operation image.

(7) The information processing apparatus according to any one of (1) to (6),
wherein the display control unit causes a plurality of icons to be lined up in a transverse direction and displayed in a lower portion of a screen.

(8) The information processing apparatus according to (7),
wherein the display control unit causes a plurality of icons to appear at predetermined positions of a screen at different timings and move up to a position at which the icons are lined up and displayed.

(9) The information processing apparatus according to any one of (1) to (8),
wherein the display control unit causes an image representing that the position is detected to be displayed at the position detected by the detecting unit.

(10) An information processing method, including:
detecting a position on an image designated by a user;
recognizing a subject captured within a range including the detected position;
selecting a plurality of functions for performing setting related to a captured image of the subject according to a recognition result of the subject; and
causing an icon representing the selected functions to be displayed to be superimposed on the image.

(11) A program causing a computer to execute a process including:
detecting a position on an image designated by a user;
recognizing a subject captured within a range including the detected position;
selecting a plurality of functions for performing setting related to a captured image of the subject according to a recognition result of the subject; and
causing an icon representing the selected functions to be displayed to be superimposed on the image.

REFERENCE SIGNS LIST

1 Information processing apparatus
11 Display
141 Detecting unit
142 Recognizing unit
143 Function selecting unit
144 Display control unit
145 Function executing unit

The invention claimed is:

1. A method for an information processing apparatus, comprising:
causing, with circuitry, display of an image on a display;
recognizing, with the circuitry, a subject in a selected portion of the image;
identifying, with the circuitry, image settings modes based on the subject recognized in the selected portion of the image;
causing, with the circuitry, display of icons corresponding to the image setting modes identified;
causing, with the circuitry, animation of movement of the icons from an first location in which the icons are not aligned with respect to any axis of the display to a second location where the icons are aligned with respect to at least one axis of the display, the icons entering a state in which they are selectable by a user after reaching the second location; and
specifying, with the circuitry, one of the image setting modes based on selection of one of the icons.

2. The method according to claim 1, further comprising executing the specified image setting mode.

3. The method according to claim 1, wherein the information processing apparatus comprises a touch screen, and the selected portion of the image is selected based on a touch position on the touch screen.

4. The method according to claim 3, further comprising:
causing display of an identification of the selected portion of the image based on the touch position on the touch screen.

5. The method according to claim 4, wherein the identification of the selected portion of the image is a colored region overlaid on the selected portion of the image.

6. The method according to claim 5, wherein the icons corresponding to the image setting modes are displayed after animation of the plurality of colored regions.

7. The method according to claim 2, further comprising:
causing display of a frame around the selected portion of the image in response to execution of the specified image setting mode when the specified image setting mode is a trimming mode.

8. The method according to claim 7, further comprising:
specifying another of the image setting modes based on selection of another one of the icons;
executing the other image setting mode to cause display of a frame around a sub-portion of the selected portion of the image.

9. The method according to claim 8, wherein the sub-portion of the selected portion of the image includes a face of the subject, and the frame surrounds the face.

10. The method according to claim 9, further comprising:
causing the image to be captured when the degree of smiling of the face exceeds a predetermined threshold.

11. The method according to claim 3, further comprising:
selecting at least a first portion and a second portion of the image based on at least two touch positions on the touch screen;
identifying a first set of image setting modes corresponding to the first portion of the image;
identifying a second set of image setting modes corresponding to the second portion of the image; and specifying at least one of an image setting mode for the first portion of the image based on the first set of image setting modes and an image setting mode for the second portion of the image based on the second set of image setting modes.

12. The method according to claim 2, further comprising:
causing display of an adjustment control on the image in response to execution of the specified image setting mode.

13. The method according to claim 12, further comprising:
adjusting a parameter of the selected portion of the image based on operation of the adjustment control.

14. The method according to claim 13, wherein the parameter includes a color tone, a chroma setting, a focus mode and a color part setting.

15. The method according to claim 1, further comprising:
causing display of a cursor frame that surrounds the selected icon when the selected icon is selected.

16. The method according to claim 1, wherein different image setting modes are identified based on whether the subject is a person, a building or a plant.

17. The method according to claim 1, wherein the image setting modes include at least one of a trimming mode, a smiling recognition mode, an expanded dynamic range mode, a background defocus mode, and a monochromatic shooting mode.

18. A non-transitory computer-readable medium storing computer-readable instructions thereon, the computer-readable instructions when executed by a computer cause the computer to perform a method comprising:
causing display of an image on a display;
recognizing a subject in a selected portion of the image;
identifying image settings modes based on the subject recognized in the selected portion of the image;
causing display of icons corresponding to the image setting modes identified;
causing animation of movement of the icons from an first location in which the icons are not aligned with respect to any axis of the display to a second location where the icons are aligned with respect to at least one axis of the display, the icons entering a state in which they are selectable by a user after reaching the second location; and
specifying one of the image setting modes based on selection of one of the icons.

19. An information processing system, comprising:
a touch screen display to display an image and to receive selection of a portion of the image; and
circuitry configured to
cause display of the image on the touch screen display,
recognize a subject in the selected portion of the image,
identify image settings modes based on the subject recognized in the selected portion of the image,
cause display of icons corresponding to the image setting modes identified,
cause animation of movement of the icons from an first location in which the icons are not aligned with respect to any axis of the touch screen display to a second location where the icons are aligned with respect to at least one axis of the touch screen display, the icons entering a state in which they are selectable by a user after reaching the second location, and
specify one of the image setting modes based on selection of one of the icons.

20. An information processing apparatus, comprising:
a touch screen display configured to display an image and configured to receive selection of a portion of the image; and
circuitry configured to
cause display of the image on the touch screen display,
recognize a subject in the selected portion of the image,
identify image setting modes based on the subject recognized in the selected portion of the image,
cause display of icons corresponding to the image setting modes identified,
cause animation of movement of the icons from an first location in which the icons are not aligned with respect to any axis of the touch screen display to a second location where the icons are aligned with respect to at least one axis of the touch screen display, the icons entering a state in which they are selectable by a user after reaching the second location, and
specify one of the image setting modes based on selection of one of the icons.

* * * * *